US009417653B2

(12) United States Patent
Quintal

(10) Patent No.: US 9,417,653 B2
(45) Date of Patent: Aug. 16, 2016

(54) FACE-OPERATED JOYSTICK CONTROL SYSTEM

(71) Applicant: Lawrence A. Quintal, Lafayette, CO (US)

(72) Inventor: Lawrence A. Quintal, Lafayette, CO (US)

( * ) Notice: Subject to any disclaimer, the term of this patent is extended or adjusted under 35 U.S.C. 154(b) by 66 days.

(21) Appl. No.: 13/905,076

(22) Filed: May 29, 2013

(65) Prior Publication Data

US 2014/0354397 A1 Dec. 4, 2014

(51) Int. Cl.
*G06F 3/033* (2013.01)
*G05G 9/047* (2006.01)
*G05G 1/52* (2008.04)

(52) U.S. Cl.
CPC . *G05G 9/047* (2013.01); *G05G 1/52* (2013.01)

(58) Field of Classification Search
CPC ...................................................... G05G 9/047
USPC .......................................................... 345/157
See application file for complete search history.

(56) References Cited

U.S. PATENT DOCUMENTS

| | | | | |
|---|---|---|---|---|
| 3,229,059 | A * | 1/1966 | Beatty | 200/61.41 |
| 4,078,627 | A * | 3/1978 | Brown et al. | 180/6.5 |
| 4,260,035 | A | 4/1981 | Loveless et al. | |
| 4,486,630 | A * | 12/1984 | Fetchko | 200/52 R |
| 4,679,644 | A | 7/1987 | Loveless | |
| 5,143,086 | A * | 9/1992 | Duret et al. | 600/590 |
| 6,121,953 | A | 9/2000 | Walker | |
| 7,303,303 | B1 * | 12/2007 | Haynes | H05B 33/0842 362/105 |
| 8,289,443 | B2 | 10/2012 | MacKenzie | |
| 2002/0194005 | A1 * | 12/2002 | Lahr | G10L 15/24 704/271 |
| 2008/0115987 | A1 * | 5/2008 | Barthelt | 180/65.6 |
| 2010/0033814 | A1 * | 2/2010 | Pitskhelauri et al. | 359/481 |
| 2013/0012322 | A1 * | 1/2013 | Pena et al. | 463/38 |

* cited by examiner

*Primary Examiner* — Jason Olson
(74) *Attorney, Agent, or Firm* — Fish & Richardson P.C.

(57) ABSTRACT

Apparatus for controlling an object in real-time is described. In one aspect, an apparatus includes a frame, a bracket, and a stick controller. The frame is configured to be worn on a user's head and to inhibit relative movement between the frame and the user's head. The bracket extends from one or more portions of the frame and is positionable to extend to an area near the user's face with the frame is worn on the user's head. The stick controller is coupled to the bracket and being positionable for contact with user's face when the frame is worn on the user's head.

20 Claims, 7 Drawing Sheets

FACE-OPERATED JOYSTICK CONTROL SYSTEM

BACKGROUND

This specification relates to a joystick control system for controlling an object in real-time.

A joystick, also referred to as a control stick or a stick controller, is an input device that typically includes a stick that pivots on a base. A joystick is typically operated by a hand or a finger.

SUMMARY

A face-operated joystick control system may include a joystick that is operated by movements of a face of a user. The joystick may be attached to a frame, such as a headset or a headgear, that is worn on the user's head. The frame stabilizes the joystick in a fixed position relative to and in contact with the user's face. The joystick can be configured to proportionally control movements of an object in real-time in response to movements of the joystick caused by movements of an area of the user's face that is in contact with the joystick. The user can freely move his head around while wearing the face-operated joystick control system without affecting the movements of the object controlled by the joystick.

In general, one innovative aspect of the subject matter described in this specification may be implemented in apparatus that includes a frame configured to be worn on a user's head and to inhibit relative movement between the frame and the user's head; a bracket extending from one or more portions of the frame, the bracket being positionable to extend to an area near the user's face with the frame is worn on the user's head; and a stick controller coupled to the bracket, the stick controller being positionable for contact with user's face when the frame is worn on the user's head.

These and other implementations may each optionally include one or more of the following features. In various examples, the bracket is positionable to extend to an area near the user's chin when the frame is worn on the user's head. The stick controller is positionable for contact with the user's chin when the frame is positioned on the user's head. The bracket comprises two ends, and each of the two ends of the bracket configured to connect to a portion of the frame located on opposite sides of the head when the frame is positioned on the user's head. The bracket is positionable to extend in front of and across the user's face. The stick controller has two axes of movement. The apparatus further comprises a second stick controller coupled to the bracket, and the second stick controller is positionable for contact with a second portion of the user's face when the frame is worn on the user's head. Each of the first stick controller and the second stick controller have two axes of movement. The first stick controller is positionable for contact with a first cheek of the user's face, and the second stick controller is positionable for contact with a second cheek of the user's face.

Another innovative aspect of the subject matter described in this specification may be implemented in apparatus that includes a headgear configured to be stabilized on a user's head; an arm extending from a portion of the headgear, the arm configurable to extend to an area near the user's face when the headgear is worn on the user's head; and a control stick coupled to the arm, the control stick being positionable so that a tip of the control stick contacts a portion of the user's face when the headgear is worn on the user's head, the control stick being configured to control movement of a remote object in real-time and in proportion to movement of the portion of the user's face that is in contact with the tip of the control stick.

These and other implementations may each optionally include one or more of the following features. The control stick has two axes of movement and is configured to control movement of a remotely operated vehicle in two dimensions including forward, backward, left, and right in proportion to movement of the portion of the user's face including upward, downward, left, and right, respectively. The apparatus further comprises a second arm extending from another portion of the headgear, the second arm configurable to extend to another area near the user's face when the headgear is worn on the user's head; and a second control stick coupled to the second arm, the second control stick being positionable so that a tip of the second control stick contacts another portion of the user's face when the headgear is worn on the user's head, the second control stick configured to control movement of the remote object in real-time, in a third dimension, and in proportion to movement of the other portion of the user's face that is in contact with the tip of the second control stick. The tip of the first control stick is positionable to contact a first cheek of the user's face and is configured to control movement of the remote object in proportion to movement of the first cheek; and the tip of the second control stick is positionable to contact a chin or a second cheek of the user's face and is configured to control movement of the remote object in proportion to movement of the chin or the second cheek that is in contact with the tip of the second control stick. The first control stick is configured to control movement of a remotely operated vehicle in two dimensions including forward, backward, left, and right in proportion to movement of the portion of the user's face including upward, downward, left, and right, respectively; and the second control stick is configured to control movement of the remotely operated vehicle in a third dimension including upward and downward in proportion to movement of the other portion of the user's face including upward and downward, respectively. The first arm and the second arm are independently adjustable in angle and length relative to the respective portions of the headgear from which the arms extend.

Yet another innovative aspect of the subject matter described in this specification may be implemented in apparatus that includes a head-mounted assembly; a bracket extending from one or more portions of the head-mounted assembly; and a joystick coupled to the bracket, the joystick configured to proportionally control movement of a remote object in real-time.

These and other implementations may each optionally include one or more of the following features. The bracket is adjustable in angle and length relative to the one or more portions of the head-mounted assembly from which the bracket extends. The joystick is configured to proportionally control movement of the remote object in real-time over a wired link. The joystick is configured to proportionally control movement of the remote object in real-time over a radio-frequency link. The joystick is an analog electrical two-dimension controller. The joystick is configured to control movement of the remote object in two dimensions including forward, backward, left, and right. The joystick is configured to proportionally control movement of a remotely operated vehicle.

Particular implementations of the subject matter described in this specification may be implemented to realize one or more of the following advantages. A person with limited mobility in his hands and fingers, such as a quadriplegic person, can control movement of an object by moving an area of his face, such as his chin, to operate a joystick that proportionally controls the movement of the object in real-time. Because the joystick stays in contact with the user's face while he is wearing the face-operated joystick control system, he can freely move his head around to monitor the movements of the object without affecting the movements of the object controlled by the joystick. The face-operated joystick control system may be used by a person who has greater mobility, but who has his hands occupied or desires to keep his hands free.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
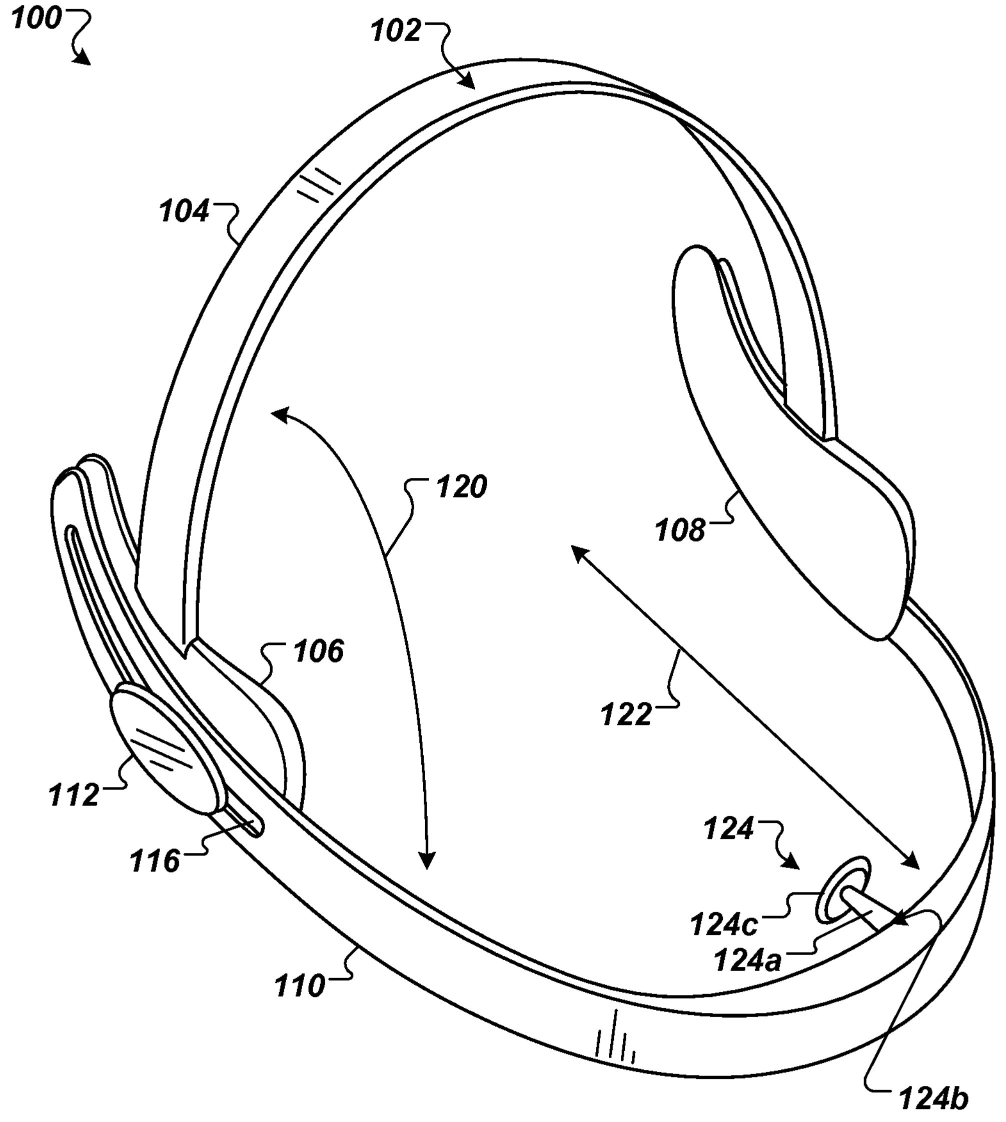
FIG. 1 is a perspective view of an example of a face-operated joystick control system.
Figure 2:
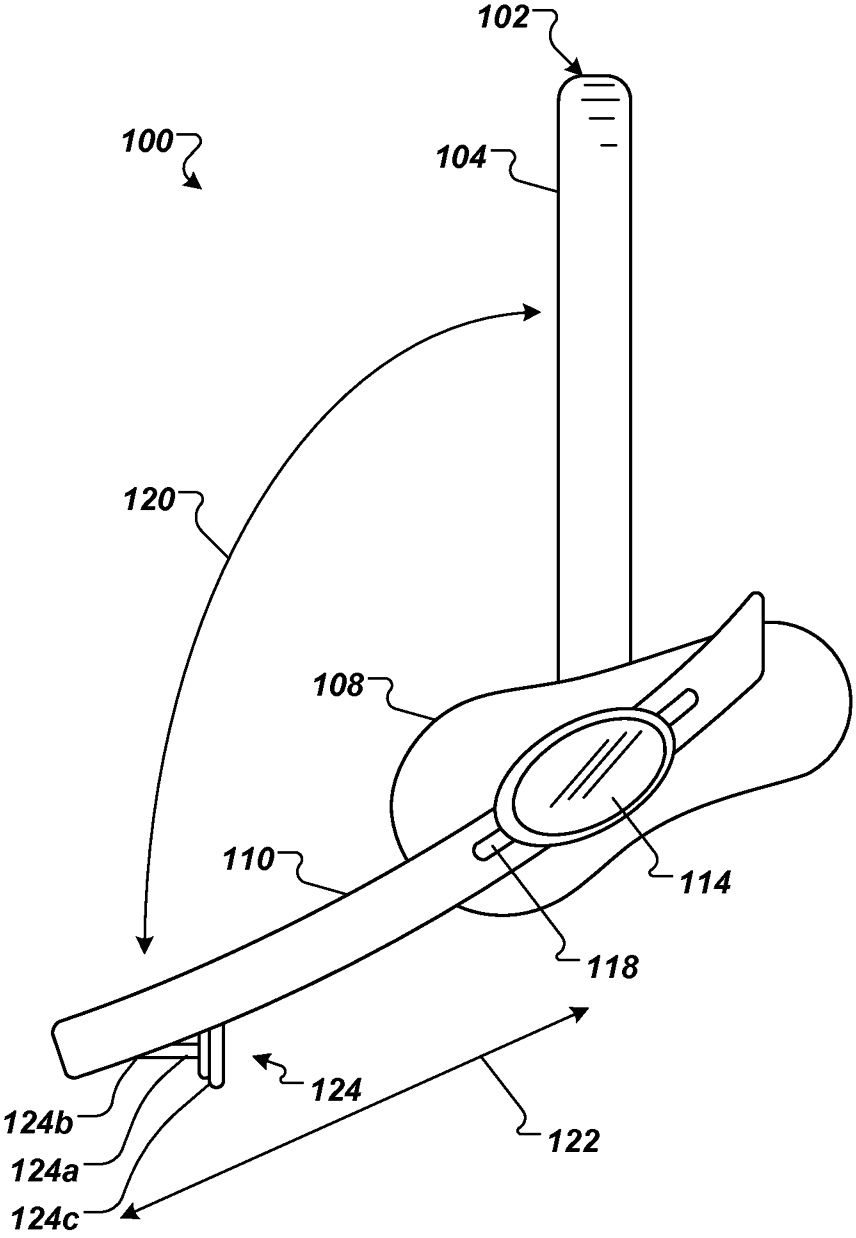
FIG. 2 is a side view of the face-operated joystick control system of FIG. 1.
Figure 3:
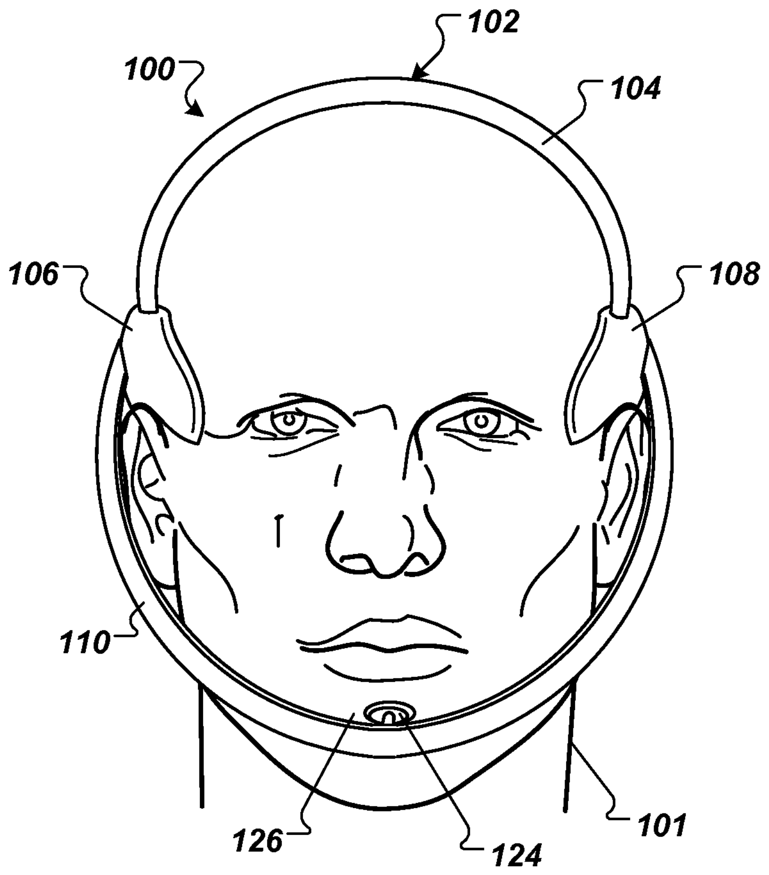
FIG. 3 is a front view of the face-operated joystick control system of FIG. 1 as worn by a user.

FIG. 1 is a perspective view of an example of a face-operated joystick control system 100. FIG. 2 is a side view of the face-operated joystick control system 100. FIG. 3 is a front-view of the face-operated joystick control system 100 as worn by a user 101. The face-operated joystick control system 100 includes a frame 102, also referred to as a headset or a headgear. The frame 102 may include a headband 104, head supports 106 and 108, and a bracket 110.

The headband 104 may be a semi-circular band of material that acts to support the frame 102 on the user's head. The headband 104 may be adjustable to fit around the top of the user's head. While FIGS. 1-3 show the frame 102 having one headband 104, the frame 102 may include any number of headbands arranged to support the frame 102 on the user's head.

The head supports 106 and 108 are attached to the headband 104 at opposite ends of the headband 104. The head supports 106 and 108 may be positioned on each side of the user's head above the ears. The head supports 106 and 108 act to stabilize the frame 102 on the user's head and prevent the frame 102 from moving on the user's head while the user 101 is wearing the face-operated joystick control system 100. While FIGS. 1-3 show the head supports 106 and 108 as pieces to be positioned above the user's ears, in some implementations the head supports 106 and 108 may be pieces resembling earphones that are to be positioned on the user's ears. While the head supports 106 and 108 are shown as two separate pieces, in some implementations a single band that partially or wholly encircles the user's head may be used to stabilize the frame 102 on the user's head and inhibit relative movement between the frame 102 and the user's head.

The bracket 110 extends from one side of the headband 104 to the other side of the headband 104. The bracket 110 may be attached to the head supports 106 and 108 using fasteners 112 and 114. The fasteners 112 and 114 may be, for example, screws that are inserted through slits 116 and 118 in the bracket 110 and into the head supports 106 and 108, The fasteners 112 and 114 may be loosened or removed from the head support 106 and 108 to allow the user to adjust the angle 120 and length 122 of the bracket 110 relative to the headband 104. The fasteners 112 and 114 may be inserted or tightened into the head supports 106 and 108 to secure the bracket 110 at the desired angle 120 and length 122. The bracket 110 may be adjusted to a position such that the bracket 110 crosses in front of a desired area of the user's face.

The face-operated joystick control system 100 includes a joystick 124, also referred to as a control stick or stick controller. The joystick 124 may include a stick **124*a* that pivots on a base 124*b*. The joystick 124 may include a knob 124*c* at the tip of the joystick 124. The knob 124*c* may be shaped such that the joystick 124 is engageable with and operable by an area of the user's face. For example, the knob 124*c* may be flattened and padded to provide comfort and ease of operation by the user 101**.

The joystick 124 may be coupled to the bracket 110. In some implementations, the joystick 124 and associated circuitry may be integrated into the bracket 110. In some implementations, the joystick 124 may include a separate base portion (not shown in FIGS. 1 and 2) that houses the associated circuitry, and the base portion is mounted onto the bracket 110. The user 101 may adjust the bracket 110 to position the joystick 124 so that the knob **124*c* is pressed against an area, such as the area 126 between the chin and mouth, of the user's face so that the user 101 can operate the joystick 124 by moving the area 126 of the user's face, The joystick 124 is operated by moving the stick 124*a* relative to its central position. The joystick 124 has at least one axis of movement for controlling movements of an object in at least one dimension. For example, a one-axis joystick may control an object to move in one dimension such as a forward-or-backward direction or an up-or-down direction. A two-axis joystick may control an object to move in two dimensions such as a forward-or-backward direction and a left-or-right direction, The joystick 124** may be used to, for example, control virtual objects in video games, machines such as cranes, trucks, unmanned vehicles, wheelchairs, surveillance cameras, and lawn mowers, or smaller electronic equipment such as laptop computers and mobile phones.

In some implementations, the joystick 124 may be an analog joystick of a fully proportional control system. In a fully proportional control system, the joystick 124 proportionally controls movements of an object, and the object responds directly to the amount and direction of movement of the joystick 124. In some implementations, the joystick 124 may be a digital joystick where movements of the joystick are processed as absolute values, such as an on or off signal for each direction, instead of subtle gradations.

While FIGS. 1-3 show one joystick 124 integrated into the bracket 110 at a center point of the bracket 110, the face-operated joystick control system 100 may include two joysticks integrated into or mounted onto the bracket 110. The two joysticks may be positioned on the bracket 110 such that the user can adjust the bracket 110 to have the joysticks touch the user's eyebrows or cheeks.

Figure 6:
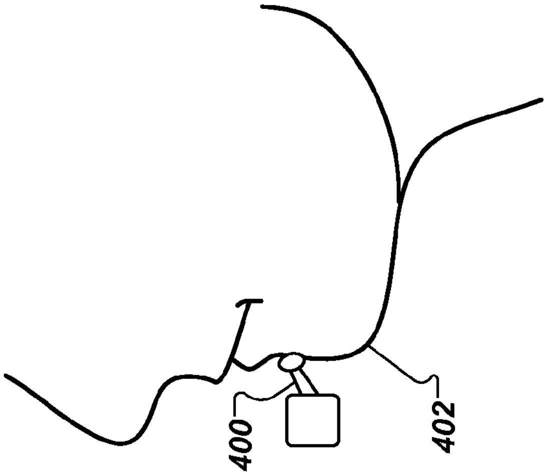
FIGS. 4-6 are side views of a joystick being operated by movements of a user's chin.
Figure 5:
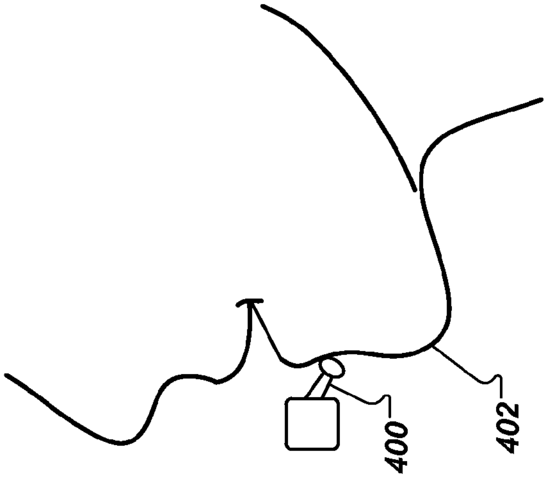
Figure 4:
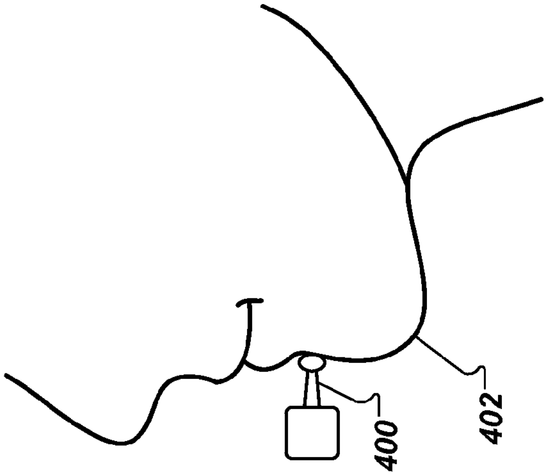

FIGS. 4-6 are side views of a joystick 400 being operated by movements of a user's chin 402. In FIG. 4, the user's chin 402 is in a natural position. The joystick 400 is in a central position and in contact with an area on or near the user's chin

402. In FIG. 5, the user moves his chin 402 in a downward direction toward his feet to move the joystick 400 in a downward direction. In FIG. 6, the user moves his chin 402 in an upward direction toward his forehead to move the joystick 402 in an upward direction.

Figure 7:
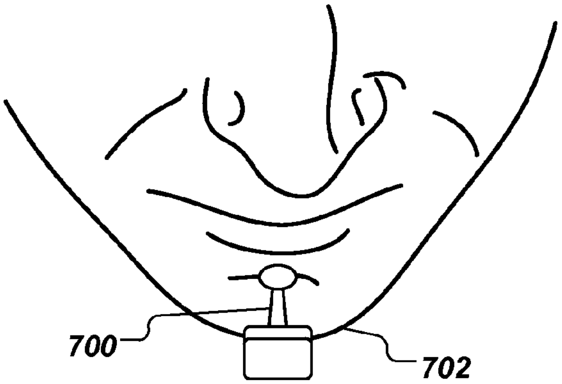
FIGS. 7-9 are top views of a joystick being operated by movements of a user's chin.
Figure 8:
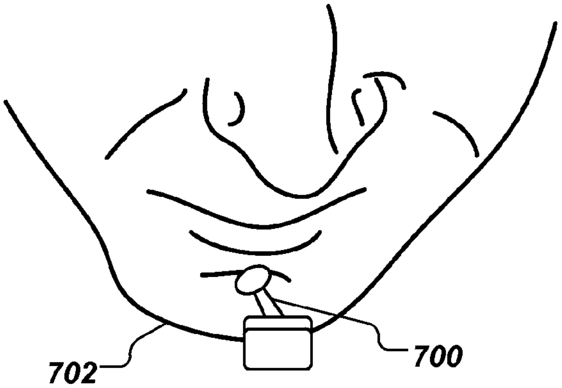
Figure 9:
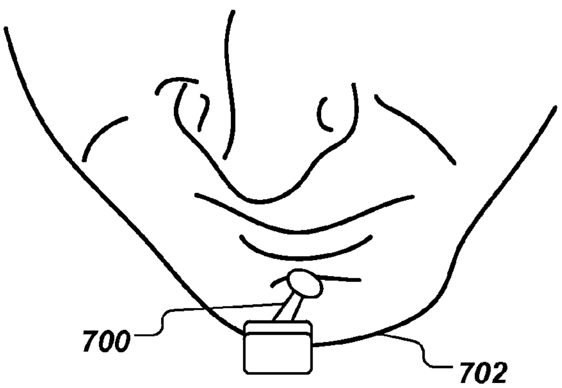

FIGS. 7-9 are top views of a joystick 700 being operated by movements of a user's chin 702. In FIG. 7, the user's chin 702 is in a natural position. The joystick 700 is in a central position and in contact with an area on or near the user's chin 702. In FIG. 8, the user moves his chin 702 to his right to move the joystick 700 to the right side of the central position. In FIG. 9, the user moves his chin 702 to his left to move the joystick 700 to the left side of the central position.

Figure 10:
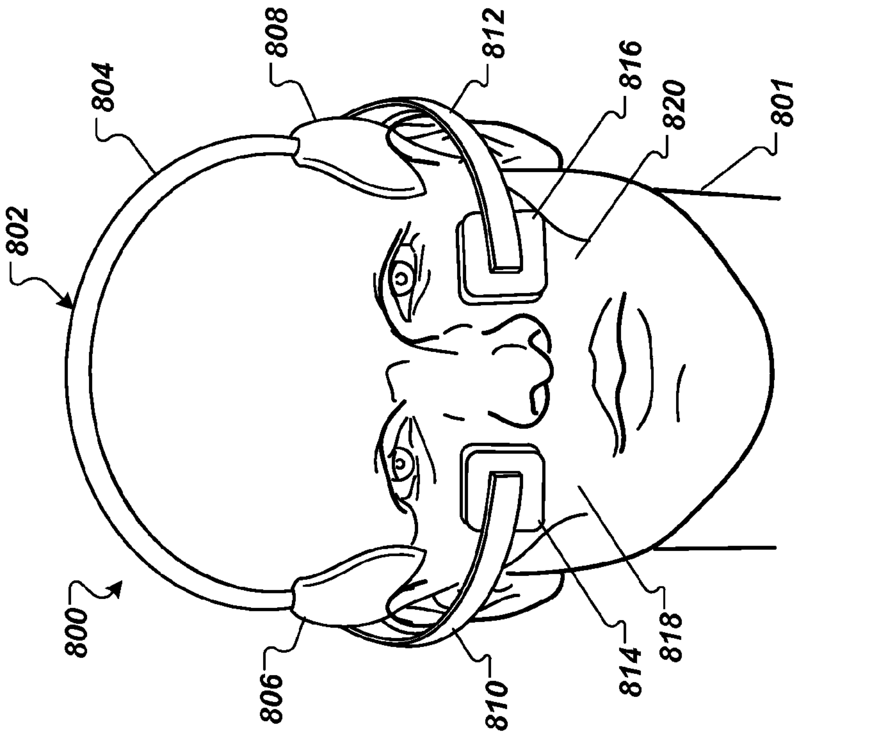
FIGS. 10 and 11 are front views of an example of a face-operated joystick control system as worn by a user.
Figure 11:
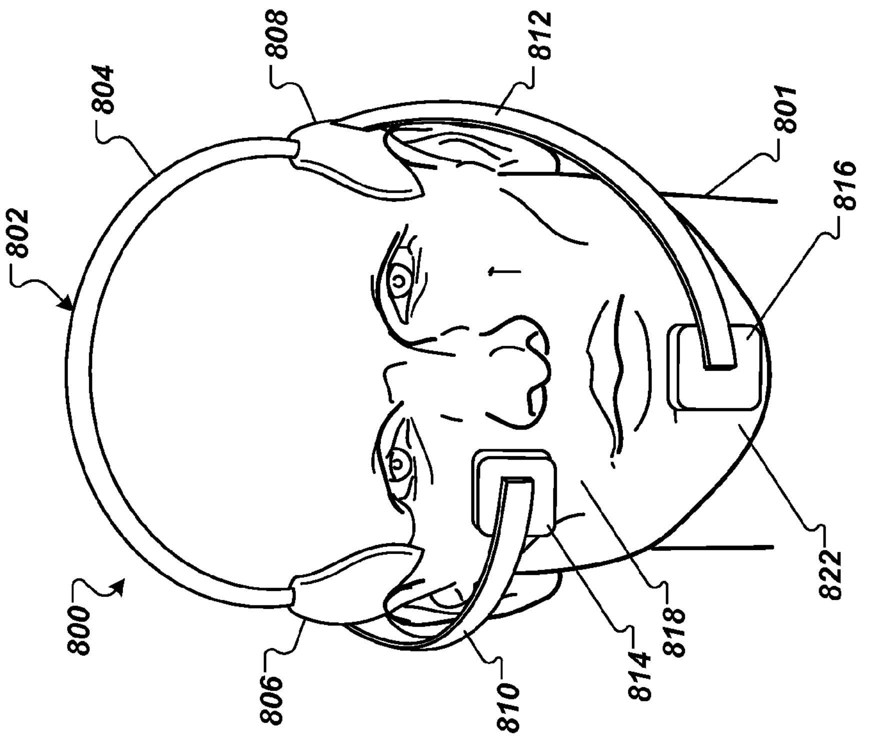

FIGS. 10 and 11 are front views of an example of a face-operated joystick control system 800 as worn by a user 801. The face-operated joystick control system 800 includes a frame 802. The frame 802 may include a headband 804, head supports 806 and 808, and arms 810 and 812. The headband 804 and the head supports 806 and 808 may be similar to the headband 104 and head supports 106 and 108 of the face-operated joystick control system 100 shown in FIGS. 1-3.

Referring to FIGS. 10 and 11, the arms 810 and 812 extend from the sides of the headband 804 to areas in front of the user's face. The arms 810 and 812 may be attached to the head supports 806 and 808 using fasteners (not shown), The fasteners may be, for example, screws that are inserted through slits or holes (not shown) in the arms and into the head supports 806 and 808. The fasteners may be loosened or removed to allow the user to adjust the angles and lengths of the arms 810 and 812 relative to the headband 804. The angle and length of the arm 810 may be adjusted independently of the angle and length of the arm 812. The fasteners may be inserted or tightened to secure the arms 810 and 812 at the desired angles and lengths.

The face-operated joystick control system 800 includes joysticks 814 and 816. The joystick 814 may be coupled to the end of the arm 810. The joystick 816 may be coupled to the end of the arm 812. In some implementations, the joysticks 814 and 816 may each include a base portion that houses associated circuitry. The base portion of the joystick 814 may be mounted on the end of the arm 810. The base portion of the joystick 816 may be mounted on the end of the arm 812. In some implementations, the joystick 814 and associated circuitry may be integrated into the arm 810, and the joystick 816 and associated circuitry may be integrated into the arm 812.

The user 801 may adjust the arm 810 to position the joystick 814 in contact with an area of the user's face so that the user can operate joystick 814 by moving the area of the user's face. The user 801 may adjust the arm 812 to position the joystick 816 in contact with another area of the user's face so that the user 801 can operate the joystick 816 by moving the other area of the user's face. The arms 810 and 812 may be fabricated using sufficiently rigid material so that the joysticks 814 and 816 remain in contact with the user's face as the user is wearing the face-operated joystick control system 800.

For the example shown in FIG. 10, the user 801 has adjusted the arm 810 to position the joystick 814 in contact with his right cheek 818 so that the user 801 can operate joystick 814 by moving his right cheek 818. The user 801 has adjusted the arm 812 to position the joystick 816 in contact with his left cheek 820 so that the user 801 can operate joystick 816 by moving his left cheek 820.

For the example shown in FIG. 11, the user 801 has adjusted the arm 810 to position the joystick 814 in contact with his right cheek 818 so that the user 801 can operate joystick 814 by moving his right cheek 818. The user 801 has adjusted the arm 812 to position the joystick 816 in contact with his chin 822 so that the user 801 can operate joystick 816 by moving his chin 822.

Each of the joysticks 814 and 816 have at least one axis of movement for collectively controlling an object in at least two dimensions. For example, the joystick 814 may have one axis of movement to control an object, such as a radio-controlled (RC) car, in one dimension such as a forward-or-backward direction, and the joystick 816 may have one axis of movement to control the RC car in another dimension such as a left-or-right direction. As another example, the joystick 814 may have two axes of movement to control an object, such as a RC helicopter, in two dimensions such as forward-or-backward and left-or-right directions, and the joystick 816 may have one axis of movement to control the RC helicopter in a third dimension such as an up-or-down direction.

In some implementations, the joysticks 814 and 816 may be analog joysticks that proportionally control movements of an object, and the object responds directly to the amounts and directions of movements of the joysticks 814 and 816. In some implementations, the joysticks 814 and 816 may be digital joysticks where movements of each of the joysticks are processed as absolute values, such as an on or off signal for each direction, instead of subtle gradations. In some implementations, one of the joysticks 814 or 816 may be an analog joystick, and the other one of the joysticks 814 or 816 may be a digital joystick.

Figure 12:
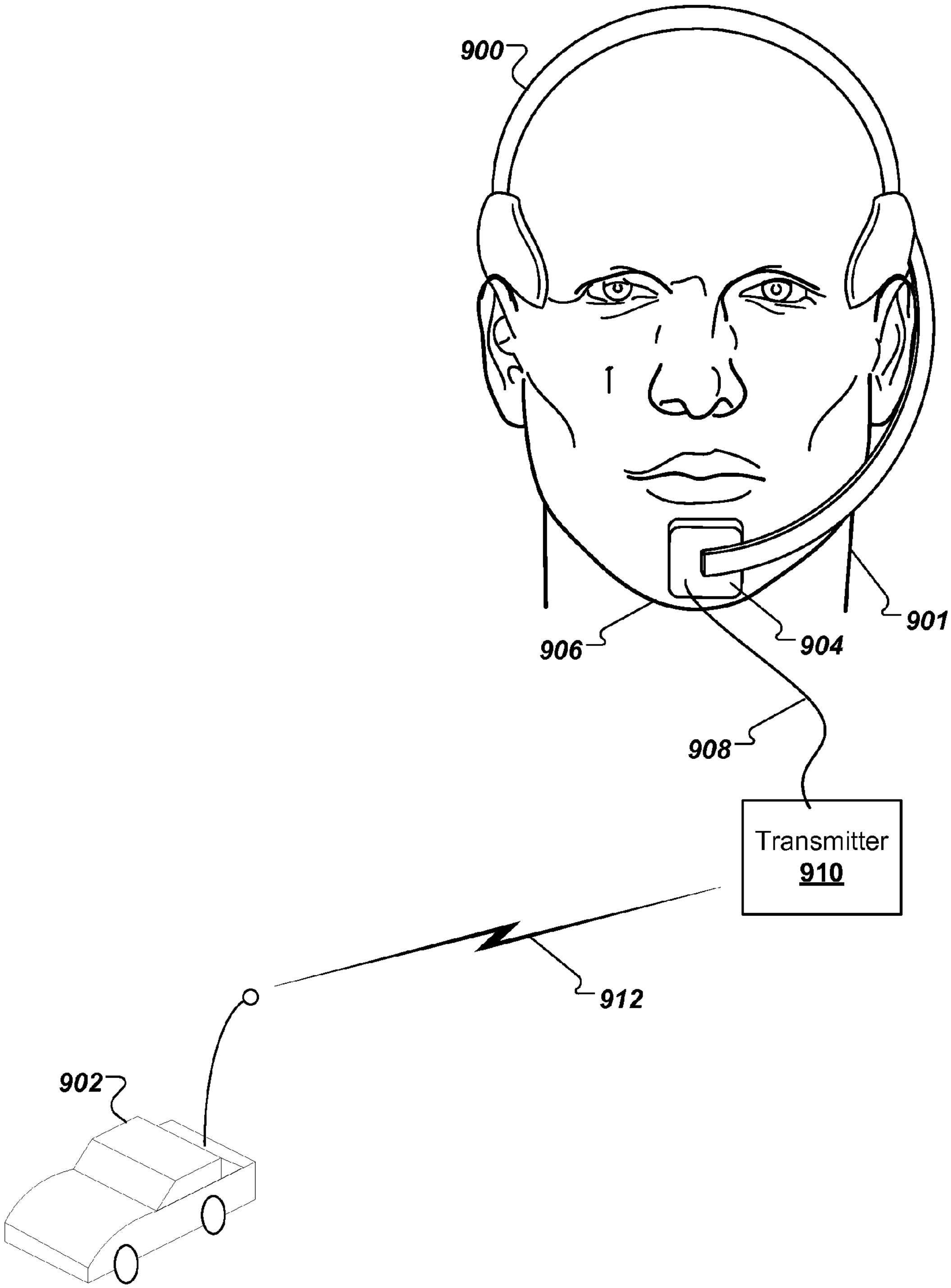
FIG. 12 shows a face-operated joystick control system coupled to an object for proportional control of the movement of the object in real-time.

FIG. 12 shows a face-operated joystick control system 900 coupled to an object, such as a RC car 902, for proportional control of the movement of the RC car 902 in real-time. An object is considered to be controlled in real-time when the object responds immediately or without significant delay to user input.

The face-operated joystick control system 900 includes a joystick 904. The position of the joystick 904 can be adjusted so that the joystick 904 contacts an area of the user's face, such as an area near the user's chin 906.

The face-operated joystick control system 900 communicates with the RC car 902 over a communication link. The communication link may include a wired link, a wireless link, or both. For example, the joystick 904 may be configured to communicate with a remote transmitter 910 over a wired link 908, and the transmitter 910 communicates with the RC car 902 over a wireless link 912 such as a radio-frequency link.

The user 901 moves his chin 906 to operate the joystick 904 and control movement of the RC car 902. For example, the user 901 can move his chin 906 upward from its natural position toward his forehead to move the joystick 904 in an upward direction from its central position. The upward movement of the joystick 904 controls the RC car 902 to move in a forward direction. The user 901 can move his chin 906 downward from its natural position toward his feet to move the joystick 904 in a downward direction from its central position. The downward movement of the joystick 904 controls the RC car 902 to move in a backward direction. The speed of the RC car 902 may be dependent upon the amount of vertical (upward or downward) displacement of the joystick 904 from its central position.

The user 901 can move his chin 906 to the left of its natural position to move the joystick 904 left from its central position. The movement of the joystick 904 to the left of its central position controls the RC car 902 to turn left. The user 901 can move his chin 906 to the right of its natural position to move the joystick 904 right from its central position. The movement of the joystick 904 to the right of its central position controls the RC car 902 to turn right. Steering control, such as turn radius, may be dependent upon the amount of horizontal (left or right) displacement of the joystick 904 from its central position.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. Thus, particular embodiments have been described. Other embodiments are within the scope of the following claims.

What is claimed is:

1. An apparatus, comprising:

a frame configured to be worn on a user's head and to inhibit relative movement between the frame and the user's head;

a rigid bracket extending from one or more portions of the frame, the bracket being positionable to extend to an area near the user's face when the frame is worn on the user's head; and a stick controller coupled to the bracket, the stick controller including a stick that pivots on a base, the stick extending from the base in a direction toward the user's face and registering movements of the user's jaw relative to the user's head, wherein the bracket is adjustable to position the base in a fixed position relative to the frame and at a fixed distance relative to the user's face irrespective of movement of the user's head for selective contact of the stick with the user's face when the frame is worn on the user's head.

2. The apparatus of claim 1, wherein:

the bracket is positionable to extend to an area near the user's chin when the frame is worn on the user's head; and the stick controller is positionable for selective contact of the stick with the user's chin when the frame is positioned on the user's head.

3. The apparatus of claim 1, wherein the bracket comprises two ends, each of the two ends of the bracket configured to connect to a portion of the frame located on opposite sides of the head when the frame is positioned on the user's head, and the bracket is positionable to extend in front of and across the user's face.

4. The apparatus of claim 1, wherein the stick controller has two axes of movement.

5. The apparatus of claim 1, wherein the stick controller is a first stick controller positionable for contact with a first portion of the user's face, and the apparatus further comprises:

a second stick controller coupled to the bracket, the second stick controller positionable for contact with a second portion of the user's face when the frame is worn on the user's head.

6. The apparatus of claim 5, wherein each of the first stick controller and the second stick controller have two axes of movement.

7. The apparatus of claim 5, wherein:

the first stick controller is positionable for selective contact of the stick with a first cheek of the user's face; and the second stick controller is positionable for contact with a second cheek of the user's face.

8. An apparatus, comprising:

a headgear configured to be stabilized on a user's head;

a rigid arm extending from a portion of the headgear, the arm configurable to extend to an area near the user's face when the headgear is worn on the user's head; and a control stick coupled to the arm, the control stick configured to pivot on a base, the control stick extending from the base in a direction toward the user's face and configured to register movements of the user's jaw relative to the user's head, wherein the arm is adjustable to position the base in a fixed position relative to the headgear and at a fixed distance relative to the user's face irrespective of movement of the user's head so that a tip of the control stick selectively contacts a portion of the user's face when the headgear is worn on the user's head, the control stick being configured to control movement of a remote object in real-time and in proportion to movement of the portion of the user's face that is in contact with the tip of the control stick.

9. The apparatus of claim 8, wherein the control stick has two axes of movement and is configured to control movement of a remotely operated vehicle in two dimensions including forward, backward, left, and right in proportion to movement of the portion of the user's face including upward, downward, left, and right, respectively.

10. The apparatus of claim 8, wherein the arm is a first arm, the control stick is a first control stick configured to control movement of the remote object in two dimensions, and the apparatus further comprises:

a second arm extending from another portion of the headgear, the second arm configurable to extend to another area near the user's face when the headgear is worn on the user's head; and a second control stick coupled to the second arm, the second control stick being positionable so that a tip of the second control stick contacts another portion of the user's face when the headgear is worn on the user's head, the second control stick configured to control movement of the remote object in real-time, in a third dimension, and in proportion to movement of the other portion of the user's face that is in contact with the tip of the second control stick.

11. The apparatus of claim 10, wherein:

the tip of the first control stick is positionable to selectively contact a first cheek of the user's face and is configured to control movement of the remote object in proportion to movement of the first cheek; and the tip of the second control stick is positionable to contact a chin or a second cheek of the user's face and is configured to control movement of the remote object in proportion to movement of the chin or the second cheek that is in contact with the tip of the second control stick.

12. The apparatus of claim 10, wherein:

the first control stick is configured to control movement of a remotely operated vehicle in two dimensions including forward, backward, left, and right in proportion to movement of the portion of the user's face including upward, downward, left, and right, respectively; and the second control stick is configured to control movement of the remotely operated vehicle in a third dimension including upward and downward in proportion to movement of the other portion of the user's face including upward and downward, respectively.

13. The apparatus of claim 10, wherein the first arm and the second arm are independently adjustable in angle and length relative to the respective portions of the headgear from which the arms extend.

14. An apparatus, comprising:

a head-mounted assembly;

a rigid bracket extending from one or more portions of the head-mounted assembly; and a joystick coupled to the bracket, the joystick including a stick that pivots on a base, the stick extending from the base in a direction toward a user's face and registering movements of the user's jaw relative to the user's head, wherein the bracket is adjustable to position the base in a fixed position relative to the head-mounted assembly and at a fixed distance relative to the user's face irrespective of movement of the user's head for selective control of the stick to proportionally control movement of a remote object in real-time.

15. The apparatus of claim 14, wherein the bracket is adjustable in angle and length relative to the one or more portions of the head-mounted assembly from which the bracket extends.

16. The apparatus of claim 14, wherein the joystick is configured to proportionally control movement of the remote object in real-time over a wired link.

17. The apparatus of claim 14, wherein the joystick is configured to proportionally control movement of the remote object in real-time over a radio-frequency link.

18. The apparatus of claim 14, wherein the joystick is an analog electrical two-dimension controller.

19. The apparatus of claim 14, wherein the joystick is configured to control movement of the remote object in two dimensions including forward, backward, left, and right.

20. The apparatus of claim 14, wherein the joystick is configured to proportionally control movement of a remotely operated vehicle.

* * * * *